United States Patent
Shinohara et al.

(10) Patent No.: US 11,932,716 B2
(45) Date of Patent: Mar. 19, 2024

(54) RADIATON CURABLE RESIN COMPOSITION

(71) Applicant: Covestro (Netherlands) B.V., Nieuwegein (NL)

(72) Inventors: Noriyasu Shinohara, Tokyo (JP); Seiichirou Takahashi, Tokyo (JP)

(73) Assignee: Covestro (Netherlands) B.V., Geleen (NL)

(*) Notice: Subject to any disclaimer, the term of this patent is extended or adjusted under 35 U.S.C. 154(b) by 546 days.

(21) Appl. No.: 17/264,034

(22) PCT Filed: Aug. 30, 2019

(86) PCT No.: PCT/JP2019/034254
§ 371 (c)(1),
(2) Date: Jan. 28, 2021

(87) PCT Pub. No.: WO2020/045663
PCT Pub. Date: Mar. 5, 2020

(65) Prior Publication Data
US 2021/0171691 A1  Jun. 10, 2021

(30) Foreign Application Priority Data
Aug. 31, 2018 (JP) ................. 2018-163751

(51) Int. Cl.
| | | |
|---|---|---|
| C08F 2/46 | (2006.01) | |
| C03C 25/326 | (2018.01) | |
| C03C 25/6226 | (2018.01) | |
| C08F 2/50 | (2006.01) | |
| C08F 283/00 | (2006.01) | |
| C08G 61/04 | (2006.01) | |
| G02B 6/02 | (2006.01) | |

(52) U.S. Cl.
CPC ........ C08F 283/008 (2013.01); C03C 25/326 (2013.01); C03C 25/6226 (2013.01); G02B 6/02395 (2013.01)

(58) Field of Classification Search
CPC .. C08G 18/10; C08G 18/289; C08G 18/4845; C08G 18/6715; C08G 18/7615; C03C 25/6226; C03C 25/1065; C03C 25/106; C03C 25/326; C08F 283/008; C08F 2/50; G02B 6/02395; C09D 175/04
USPC ........... 522/38, 33, 6, 71, 1, 189, 184; 520/1
See application file for complete search history.

(56) References Cited

U.S. PATENT DOCUMENTS

| | | | |
|---|---|---|---|
| 9,746,605 B2 | 8/2017 | Sohma et al. | |
| 9,766,397 B2 | 9/2017 | Homma | |
| 2002/0183415 A1 | 12/2002 | Szum et al. | |
| 2007/0191505 A1* | 8/2007 | Takahashi | C08G 18/672 522/178 |
| 2010/0329617 A1 | 12/2010 | Bulters et al. | |
| 2012/0128313 A1 | 5/2012 | Wu et al. | |
| 2013/0343717 A1 | 12/2013 | Tachibana et al. | |
| 2016/0047977 A1 | 2/2016 | Sohma et al. | |

FOREIGN PATENT DOCUMENTS

| | | | |
|---|---|---|---|
| JP | 2000344844 A | | 12/2000 |
| JP | 2004043626 | * | 2/2004 |
| JP | 2004043626 A | | 2/2004 |
| JP | 2010235812 A | | 10/2010 |
| JP | 2012111674 | * | 6/2012 |
| JP | 2012111674 A | | 6/2012 |
| JP | 2014006344 A | | 1/2014 |
| JP | 2018077303 A | | 5/2018 |
| WO | 2001005724 A2 | | 1/2001 |

OTHER PUBLICATIONS

Oba et al, JP 2004043626 Machine Translation, Feb. 12, 2004 (Year: 2004).*
Imai et al, JP 2012111674 Machine Translation, Jun. 14, 2012 (Year: 2012).*

* cited by examiner

*Primary Examiner* — Jessica Whiteley
(74) *Attorney, Agent, or Firm* — Donald R. Palladino

(57) ABSTRACT

There is provided a radiation-curable resin composition for formation of a primary covering layer, the radiation-curable resin composition being able to form a cured layer having excellent flexibility and adequate mechanical strength.

A radiation-curable resin composition for formation of a primary covering layer of an optical fiber, comprising a urethane oligomer, a polymerization initiator and a free-radically polymerizable non-urethane monomer, the urethane oligomer being the reaction product of a polyether-based urethane prepolymer and an isocyanate reactive compound containing one active hydrogen group, the isocyanate reactive compound containing an aliphatic alcohol and an ethylenic unsaturated group-containing isocyanate reactive compound, and the aliphatic alcohol content in the isocyanate reactive compound being 24 mol % or higher.

19 Claims, No Drawings

RADIATON CURABLE RESIN COMPOSITION

CROSS-REFERENCE TO RELATED APPLICATIONS

This application is a U.S. national phase entry under 35 USC § 371 of International Application No. PCT/JP2019/034254, filed 30 Aug. 2019, which itself claims priority to Japanese Application No. 2018163751, filed 31 Aug. 2018, the entire contents of each of which is hereby incorporated by reference in its entirety as if fully set forth herein.

TECHNICAL FIELD

The present invention relates to a radiation-curable resin composition.

BACKGROUND ART

Optical fibers are composed of glass fibers obtained by hot melt spinning of glass, and a covering layer provided over the glass fibers for protective reinforcement. Optical fibers are produced, for example, by first forming a flexible primary covering layer (hereunder also referred to simply as "primary covering layer") on the surfaces of the glass fibers, and then forming a highly rigid secondary covering layer (hereunder also referred to simply as "secondary covering layer") on the primary covering layer. Also known are tape-like optical fibers or optical fiber cables having a plurality of optical fibers with a covering layer, that are bound with a binding material.

The method commonly used to form the covering layer on the glass fibers is, for example, to coat the glass fibers with a liquid curable resin composition and cure it with heat or light, and especially ultraviolet rays. PTL 1, for example, discloses a radiation-curing composition combining a urethane oligomer produced by a specific production method, and a compound with one ethylenic unsaturated group, as a resin composition for formation of a primary covering layer.

CITATION LIST

Japanese Unexamined Patent Application Publication No. 2012-111674

SUMMARY OF THE INVENTION

When optical fiber sides are subjected to local pressure, the cores of the glass fibers at the sections subjected to pressure bend with a small degree of curvature, often resulting in optical loss. From the viewpoint of minimizing such optical loss (also known as microbending loss), the primary covering layer preferably is sufficiently flexible. If the primary covering layer is made flexible, however, it may not be possible to obtain adequate mechanical strength (breaking strength and breaking elongation).

It is therefore an object of the present invention to provide a radiation-curable resin composition for formation of a primary covering layer, the radiation-curable resin composition being able to form a cured layer having excellent flexibility and adequate mechanical strength.

Means for Solving the Problems

As a result of much research conducted with the aim of realizing this object, the present inventors have found that by combining specific polymerizable compounds it is possible to obtain a radiation-curable resin composition capable of forming a cured layer having excellent flexibility and adequate mechanical strength, and have thereupon completed this invention.

Specifically, the invention provides a radiation-curable resin composition for formation of a primary covering layer of an optical fiber, comprising a urethane oligomer with an ethylenic unsaturated group, a free-radically polymerizable non-urethane monomer and a polymerization initiator, wherein the urethane oligomer with an ethylenic unsaturated group is the reaction product of a polyether-based urethane prepolymer and an isocyanate reactive compound containing one active hydrogen group, the isocyanate reactive compound contains an aliphatic alcohol and an ethylenic unsaturated group-containing isocyanate reactive compound, and the aliphatic alcohol content in the isocyanate reactive compound is 24 mol % or higher.

In the radiation-curable resin composition, the curing speed S as defined by the following formula (1) may be 15% or higher.

$$S(\%) = Y_{20}/Y_{1000} \times 100 \qquad \text{Formula (1):}$$

[In the formula, $Y_{1000}$ and $Y_{20}$ are the Young's moduli at 23° C. for cured films of the radiation-curable resin composition, the curing conditions for $Y_{1000}$ and $Y_{20}$ being 1 J/cm² and 20 mJ/cm², respectively.]

In the radiation-curable resin composition, the Young's modulus at 25° C. for the cured film of the radiation-curable resin composition with curing conditions of 1 J/cm² may be 0.8 MPa or smaller.

The free-radically polymerizable non-urethane monomer may contain at least one vinyl group-containing compound selected from the group consisting of vinyl ester compounds and vinylamide compounds.

The vinylamide compound may contain an N-vinylcaprolactam.

At least a portion of the urethane oligomer with an ethylenic unsaturated group and/or the free-radically polymerizable non-urethane monomer may be a (meth)acryloyl group-containing compound. In this case, the ratio of the number of moles of the (meth)acryloyl group-containing compound with respect to the number of moles of the vinyl group-containing compound may be 1/1 to 10/1.

The urethane oligomer with an ethylenic unsaturated group and the free-radically polymerizable non-urethane monomer may have an ethylenic unsaturated group. In this case, the ratio of the number of moles of monofunctional compounds with one ethylenic unsaturated group with respect to the number of moles of polyfunctional compounds with two or more ethylenic unsaturated groups may be 2/1 to 100/1.

The urethane oligomer with an ethylenic unsaturated group or the free-radically polymerizable non-urethane monomer contains a monofunctional (meth)acrylate and a polyfunctional (meth)acrylate, and the ratio of the number of moles of the monofunctional (meth)acrylate with respect to the number of moles of the polyfunctional (meth)acrylate may be 1/1 to 75/1.

The number-average molecular weight of the urethane oligomer with an ethylenic unsaturated group may be 2000 or greater.

The urethane oligomer with an ethylenic unsaturated group may contain a monofunctional urethane (meth)acrylate oligomer and a bifunctional urethane (meth)acrylate oligomer.

The ratio of the number of moles of the bifunctional urethane (meth)acrylate oligomer with respect to the number of moles of the monofunctional urethane (meth)acrylate oligomer may be 3/1 to 100/1.

The urethane oligomer with an ethylenic unsaturated group may contain an alkoxysilyl group-containing urethane oligomer having one (meth)acryloyl group at one end and one alkoxysilyl group at the other end.

The ratio of the number of moles of the alkoxysilyl group-containing urethane oligomer with respect to the number of moles of the monofunctional urethane (meth)acrylate oligomer other than the alkoxysilyl group-containing urethane oligomer may be 0.01/1 to 0.7/1.

The urethane oligomer with an ethylenic unsaturated group may contain a bifunctional urethane (meth)acrylate oligomer. In this case, the ratio of the number of moles of the alkoxysilyl group-containing urethane oligomer with respect to the number of moles of the bifunctional urethane (meth)acrylate oligomer may be 0.2/1 to 20/1.

The free-radically polymerizable non-urethane monomer may contain a free-radically polymerizable alkoxysilane.

The free-radically polymerizable alkoxysilane may have a (meth)acryloyl group.

The molar ratio of the alkoxysilyl group-containing urethane oligomer with respect to the free-radically polymerizable alkoxysilane may be 0.1/1 to 10/1.

The radioactive curable resin composition may further contain a non-free-radically polymerizable alkoxysilane.

The ratio of the number of moles of the alkoxysilyl group-containing urethane oligomer with respect to the number of moles of the non-free-radically polymerizable alkoxysilane may be 0.01/1 to 4/1.

The ratio of the number of moles of the free-radically polymerizable alkoxysilane with respect to the number of moles of the non-free-radically polymerizable alkoxysilane may be 0.01/1 to 3/1.

The ratio of the total number of moles of the alkoxysilyl group-containing urethane oligomer and the free-radically polymerizable alkoxysilane with respect to the number of moles of the non-free-radically polymerizable alkoxysilane may be 0.05/1 to 4/1.

Effect of the Invention

According to the invention it is possible to provide a radiation-curable resin composition for formation of a primary covering layer, the radiation-curable resin composition being able to form a cured layer having excellent flexibility and adequate mechanical strength.

DESCRIPTION OF EMBODIMENTS

A preferred embodiment of the invention will now be described in detail. However, the present invention is not limited to the embodiments described below.

The radiation-curable resin composition of the embodiment is a radiation-curable resin composition for formation of a primary covering layer of an optical fiber, comprising a urethane oligomer with an ethylenic unsaturated group (hereunder also referred to simply as "urethane oligomer"), a free-radically polymerizable non-urethane monomer and a polymerization initiator. The phrase "for formation of a primary covering layer of an optical fiber" may also refer to use as a primary material.

The radiation referred to here is infrared rays, visible light rays, ultraviolet rays, X-rays, an electron beam, α-rays, β-rays, γ-rays or the like, with ultraviolet rays being particularly preferred.

The urethane oligomer is the reaction product of a polyether-based urethane prepolymer and an isocyanate reactive compound containing one active hydrogen group. Specifically, the urethane oligomer contains constituent components derived from a polyether-based urethane prepolymer and an isocyanate reactive compound containing one active hydrogen group.

The polyether-based urethane prepolymer is the reaction product of a polyether polyol and a polyisocyanate, and it has isocyanate groups at the molecular ends. The polyether-based urethane prepolymer may be the reaction product of an aliphatic polyether diol and a diisocyanate.

The aliphatic polyether diol is preferably an aliphatic polyether diol obtained by ring-opening copolymerization of, for example, polyethylene glycol, polypropylene glycol, polytetramethylene glycol, polyhexamethylene glycol, polyheptamethylene glycol or polydecamethylene glycol and two or more types of ion-polymerizable cyclic compounds.

Examples of such ion-polymerizable cyclic compounds include cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether and glycidyl benzoate ester.

Specific examples of polyether diols obtained by ring-opening copolymerization two or more types of the aforementioned ion-polymerizable cyclic compounds include binary copolymers obtained by combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, or butene-1-oxide and ethylene oxide, and terpolymers obtained by combinations of tetrahydrofuran, butene-1-oxide and ethylene oxide.

Others which may be used include polyether diols obtained by ring-opening copolymerization of the aforementioned ion-polymerizable cyclic compounds with cyclic imines such as ethyleneimine; cyclic lactone acids such as β-propiolactone and glycolic acid lactide; or dimethylcyclopolysiloxane.

The aliphatic polyether diol may be obtained as a commercial product such as PTMG650, PTMG1000 or PTMG2000 (all by Mitsubishi Chemical Corp.), PPG400, PPG1000, EXCENOL720, 1020 or 2020 (all by Asahi-Olin, Ltd.), PEG1000, UNISAFE DC1100 or DC1800 (all by NOF Corp.), PPTG2000, PPTG1000, PTG400 or PTGL2000 (all by Hodogaya Chemical Co., Ltd.), Z-3001-4, Z-3001-5, PBG2000A, PBG2000B, EO/BO4000 or EO/BO2000 (all by Dai-ichi Kogyo Seiyaku Co., Ltd.), or Acclaim 2200, 2220, 3201, 3205, 4200, 4220, 8200 or 12000 (all by Sumitomo Bayer Urethane Co., Ltd.), for example.

Of these aliphatic polyether diols, using a diol with a number-average molecular weight of 1000 to 5000, which is a ring-opening polymer of one or more different ion-polymerizable cyclic compounds of 2 to 4 carbon atoms, is preferred from the viewpoint of achieving both high-speed coatability of the resin solution and flexibility of the covering material. Preferred aliphatic polyether polyols include ring-opening polymers of one or more oxides selected from among ethylene oxide, propylene oxide, butene-1-oxide and isobutene oxide, having number-average molecular weights of 1000 to 4000. The aliphatic polyether diol is most preferably a ring-opening polymer of propylene oxide having a number-average molecular weight of 1000 to 3000.

Examples of diisocyanates include aromatic diisocyanates, alicyclic diisocyanates and aliphatic diisocyanates. Examples of aromatic diisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanatoethyl) fumarate, 6-isopropyl-1,3-phenyl diisocyanate, 4-diphenylpropane diisocyanate and tetramethylxylylene diisocyanate. Examples of alicyclic diisocyanates include isophorone diisocyanate, methylenebis(4-cyclohexyl isocyanate), hydrogenated diphenylmethane diisocyanate, hydrogenated xylylene diisocyanate, 2,5-bis(isocyanatomethyl)-bicyclo[2.2.1]heptane and 2,6-bis(isocyanatomethyl)-bicyclo[2.2.1]heptane. Examples of aliphatic diisocyanates include 1,6-hexane diisocyanate, 2,2,4-trimethylhexamethylene diisocyanate and lysine diisocyanate.

From the viewpoint of economy and obtaining a composition with stable quality, the diisocyanate is preferably an aromatic diisocyanate, and more preferably 2,4-tolylene diisocyanate or 2,6-tolylene diisocyanate. The diisocyanate may be used alone, or two or more may be used in combination.

The isocyanate reactive compound contains one active hydrogen group, examples of active hydrogen groups including mercapto group (—SH), hydroxy group (—OH) and amino group (—NH$_2$).

The isocyanate reactive compound contains an aliphatic alcohol and an ethylenic unsaturated group-containing isocyanate reactive compound. The aliphatic alcohol and the ethylenic unsaturated group-containing isocyanate reactive compound is a compound having one active hydrogen group. Ethylenic unsaturated groups include (meth)acryloyl group, vinyl group, vinylene group and vinylidene group. Throughout the present specification, "(meth)acryloyl group" means "acryloyl group" and its corresponding "methacryloyl group". The same applies to the expression "(meth)acrylate".

The ethylenic unsaturated group in the ethylenic unsaturated group-containing isocyanate reactive compound is preferably a (meth)acryloyl group. The active hydrogen group of the ethylenic unsaturated group-containing isocyanate reactive compound is preferably a hydroxy group. That is, the ethylenic unsaturated group-containing isocyanate reactive compound may be a compound with a (meth)acryloyl group and an active hydrogen group (an active hydrogen group-containing (meth)acrylate), or it may be a compound with a (meth)acryloyl group and a hydroxy group (a hydroxy group-containing (meth)acrylate).

Examples of hydroxy group-containing (meth)acrylates include hydroxy group-containing (meth)acrylates having a hydroxy group bonded to the primary carbon atom (also known as primary hydroxy group-containing (meth)acrylates), hydroxy group-containing (meth)acrylates having a hydroxy group bonded to the secondary carbon atom (also known as secondary hydroxy group-containing (meth)acrylates), and hydroxy group-containing (meth)acrylates having a hydroxy group bonded to the tertiary carbon atom (also known as tertiary hydroxy group-containing (meth)acrylates). The hydroxy group-containing (meth)acrylate may be a primary hydroxy group-containing (meth)acrylate or secondary hydroxy group-containing (meth)acrylate from the viewpoint of reactivity with isocyanate groups.

Examples of primary hydroxy group-containing (meth)acrylates include 2-hydroxyethyl (meth)acrylate, 3-hydroxypropyl (meth)acrylate, 4-hydroxybutyl (meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate and trimethylolethane di(meth)acrylate.

Examples of secondary hydroxy group-containing (meth)acrylates include 2-hydroxypropyl (meth)acrylate, 2-hydroxybutyl (meth)acrylate, 2-hydroxy-3-phenyloxypropyl (meth)acrylate and 4-hydroxycyclohexyl (meth)acrylate, as well as compounds obtained by addition reaction between glycidyl group-containing compounds such as alkyl glycidyl ethers, allyl glycidyl ethers and glycidyl (meth)acrylate, and (meth)acrylic acid.

The content of the ethylenic unsaturated group-containing isocyanate reactive compound in the isocyanate reactive compound may be 40 mol % or higher, 45 mol % or higher or 50 mol % or higher, and 60 mol % or lower or 55 mol % or lower, from the viewpoint of more notably exhibiting the effect of the invention.

The isocyanate reactive compound contains an aliphatic alcohol with a hydroxy group, as an active hydrogen group. The number of carbon atoms of the aliphatic alcohol may be 1 to 15, 5 to 12 or 6 to 10. The carbon chain of the aliphatic alcohol may be a straight chain or branched chain. Examples of aliphatic alcohols include methanol, ethanol, propanol, butanol and 2-ethyl-1-hexanol. From the viewpoint of more notably exhibiting the effect of the invention, the aliphatic alcohol may be methanol or 2-ethyl-1-hexanol.

The aliphatic alcohol content of the isocyanate reactive compound is 24 mol % or higher. From the viewpoint of more notably exhibiting the effect of the invention, the aliphatic alcohol content of the isocyanate reactive compound may be 30 mol % or higher, 35 mol % or higher or 40 mol % or higher, and it may be 60 mol % or lower, 55 mol % or lower, 50 mol % or lower or 45 mol % or lower.

The isocyanate reactive compound may further contain an alkoxysilane with one active hydrogen group. Examples of alkoxysilanes with one active hydrogen group include N-(β-aminoethyl)-γ-aminopropyltrimethoxysilane, N-(β-aminoethyl)-γ-aminopropyltrimethyldimethoxysilane, γ-mercaptopropyltrimethoxysilane and γ-aminopropyltrimethoxysilane. The alkoxysilyl group-containing compound may be γ-mercaptopropyltrimethoxysilane, which is an alkoxysilane having a mercapto group as the active hydrogen group.

From the viewpoint of more notably exhibiting the effect of the invention, the content of the alkoxysilane with one active hydrogen group in the isocyanate reactive compound may be 2 mol % or higher or 3 mol % or higher, and it may also be 10 mol % or lower, 8 mol % or lower, 7 mol % or lower, 6 mol % or lower or 5 mol % or lower.

The urethane oligomer containing the reaction product of an aliphatic polyether diol and a diisocyanate as the polyether-based urethane prepolymer may contain an oligomer having a structure represented by the following formulas (a1) and (a2) (hereunder, such oligomers will also be referred to as "oligomer a1" and "oligomer a2").

A-(ICN-POL)n-ICN-A          (a1)

A-(ICN-POL)n-ICN-R$^1$          (a2)

In these formulas, ICN each independently represents a structure derived from a diisocyanate, POL each independently represents a structure derived from an aliphatic polyether diol, n each independently represents an integer of 1.0 or greater, A each independently represents a structure derived from an ethylenic unsaturated group-containing isocyanate reactive compound, and $R^1$ represents a structure derived from an aliphatic alcohol.

The letter n is 1.0 or greater, and may be greater than 1.0, or 1.1 or greater, 1.3 or greater or 1.5 or greater, and 3.0 or smaller, 2.5 or smaller or 2.0 or smaller. For example, n may be 1.1 to 3.0, 1.3 to 2.5 or 1.5 to 2.0.

The urethane oligomer that contains the reaction product of an aliphatic polyether diol and a diisocyanate, as the polyether-based urethane prepolymer, and an alkoxysilane with one active hydrogen group as the isocyanate reactive compound, may further contain an oligomer having the structure represented by the following formula (a3) (hereunder also referred to as "oligomer a3"), in addition to oligomers a1 and a2.

A-(ICN-POL)n-ICN-$R^2$ (a3)

In the formula, $R^2$ represents a structure derived from an alkoxysilane with one active hydrogen group, and ICN, POL, n and A have the same definitions as above.

The urethane oligomer may further contain, or not contain, an oligomer having a structure represented by the following formula (a4) (oligomer a4), in addition to oligomers a1 to a3.

$R^1$-(ICN-POL)n-ICN-$R^1$ (a4)

In the formulas, ICN, POL, n, A and $R^1$ have the same definitions as above.

The urethane oligomer may contain a urethane (meth)acrylate oligomer with a (meth)acryloyl group, as an ethylenic unsaturated group. The urethane oligomer may also contain a monofunctional urethane (meth)acrylate oligomer having one (meth)acryloyl group as an ethylenic unsaturated group (corresponding to oligomers a2 and a3), and a bifunctional urethane (meth)acrylate oligomer having two (meth)acryloyl groups as ethylenic unsaturated groups (corresponding to oligomer a1).

The ratio of the number of moles of the monofunctional urethane (meth)acrylate oligomer with respect to the number of moles of the bifunctional urethane (meth)acrylate oligomer may be 3/1 to 100/1, 5/1 to 75/1, 7/1 to 50/1 or 10/1 to 35/1.

The urethane oligomer may contain, as a monofunctional urethane (meth)acrylate oligomer, an alkoxysilyl group-containing urethane oligomer with one (meth)acryloyl group at one end and one alkoxysilyl group at the other end (corresponding to oligomer a3).

The ratio of the number of moles of the alkoxysilyl group-containing urethane oligomer with respect to the number of moles of the monofunctional urethane (meth)acrylate oligomer other than the alkoxysilyl group-containing urethane oligomer may be 0.01/1 to 0.7/1, 0.02/1 to 0.5/1, 0.03/1 to 0.25/1 or 0.05/1 to 0.15/1.

The ratio of the number of moles of the alkoxysilyl group-containing urethane oligomer with respect to the number of moles of the bifunctional urethane (meth)acrylate oligomer may be 0.2/1 to 20/1, 0.5/1 to 10/1 or 1/1 to 5/1.

The number-average molecular weight (Mn) of the urethane oligomer may be 2000 or greater, 3000 or greater, 4000 or greater or 5000 or greater, and 2000 to 10,000, 3000 to 9000 or 5000 to 8000. The number-average molecular weight is the value measured by gel permeation chromatography and converted based on a standard polystyrene calibration curve.

From the viewpoint of allowing the flexibility and mechanical strength of the cured layer to be further improved, the urethane oligomer content may be 30 mass % or higher, 35 mass % or higher, 50 mass % or higher, 60 mass % or higher or 70 mass % or higher, and from the viewpoint of easily obtaining a radiation-curable resin composition with suitable viscosity it may be no higher than 90 mass %, no higher than 85 mass % or no higher than 83 mass %, with respect to 100 mass % as the total amount of the radiation-curable resin composition.

The urethane oligomer can be produced, for example, by reacting a polyether-based urethane prepolymer, an aliphatic alcohol and an ethylenic unsaturated group-containing isocyanate reactive compound. For example, after a polyether-based urethane prepolymer, an ethylenic unsaturated group-containing isocyanate reactive compound and if necessary an alkoxysilane with one active hydrogen group have been reacted, an aliphatic alcohol may be added at an aliphatic alcohol content of 24 mol % or higher in the isocyanate reactive compound, and reacted to produce the urethane oligomer.

A urethanating catalyst may also be used if necessary in the production of the urethane oligomer. Examples of urethanating catalysts include copper naphthenate, cobalt naphthenate, zinc naphthenate, dibutyltin dilaurate, dioctyltin dilaurate, triethylamine, 1,4-diazabicyclo[2.2.2]octane and 2,6,7-trimethyl-1,4-diazabicyclo[2.2.2]octane. The amount of urethanating catalyst used may be 0.01 to 1 mass % with respect to the total amount of the reaction product. The reaction temperature will usually be 5 to 90° C., and the reaction is most preferably carried out at 10 to 80° C.

The radioactive curable resin composition further contains a free-radically polymerizable non-urethane monomer. The free-radically polymerizable non-urethane monomer used may be a monomer containing an ethylenic unsaturated group. The ethylenic unsaturated group may be any of the groups mentioned above. The free-radically polymerizable non-urethane monomer used may be of a single type, or a combination of two or more types.

The free-radically polymerizable non-urethane monomer may contain a vinyl group-containing compound (also referred to as "vinyl monomer"; this excludes, however, monomers qualifying as the following (meth)acrylate monomer), and it may contain a (meth)acrylate monomer with a (meth)acryloyl group. The free-radically polymerizable non-urethane monomer may also contain a vinyl group-containing compound and a (meth)acrylate monomer.

The vinyl group-containing compound may contain at least one compound selected from the group consisting of vinyl ester compounds and vinylamide compounds. Specifically, the free-radically polymerizable non-urethane monomer may include at least one vinyl group-containing compound selected from the group consisting of vinyl ester compounds and vinylamide compounds. The number of vinyl groups in the vinyl group-containing compound may be one, or it may be two or more.

Examples of vinyl group-containing compounds include vinylamide compounds (vinyl group-containing lactams) such as N-vinylpyrrolidone and N-vinylcaprolactam, and vinylimidazole and vinylpyridine. From the viewpoint of further increasing the curing speed, the vinyl group-containing compound may be a vinylamide compound. From the same viewpoint, the vinylamide compound may be an N-vinylcaprolactam.

The content of the vinyl group-containing compound in the radioactive curable resin composition may be 3 to 20 mass % or 5 to 12 mass % with respect to 100 mass % as the total amount of the radiation-curable resin composition.

The free-radically polymerizable non-urethane monomer may contain, as (meth)acrylate monomers, a monofunctional (meth)acrylate monomer with one (meth)acryloyl group, and a polyfunctional (meth)acrylate monomer with two or more (meth)acryloyl groups.

Examples of monofunctional (meth)acrylate monomers include alicyclic structure-containing (meth)acrylates such as isobornyl (meth)acrylate, bornyl (meth)acrylate, tricyclodecanyl (meth)acrylate, dicyclopentanyl (meth)acrylate, dicyclopentenyl (meth)acrylate and cyclohexyl (meth)acrylate, and benzyl (meth)acrylate, 4-butylcyclohexyl (meth)acrylate and acryloylmorpholine. Additional examples include 2-hydroxyethyl (meth)acrylate, 2-hydroxypropyl (meth)acrylate, 4-hydroxybutyl acrylate, stearyl (meth)acrylate, isostearyl (meth)acrylate, tetrahydrofurfuryl (meth)acrylate, polyethyleneglycol mono(meth)acrylate, polypropyleneglycol mono(meth)acrylate, methoxyethylene glycol (meth)acrylate, ethoxyethyl (meth)acrylate, methoxypolyethylene glycol (meth)acrylate and methoxypolypropylene glycol (meth)acrylate. The aforementioned hydroxy group-containing (meth)acrylates may also be used as monofunctional (meth)acrylate monomers.

The content of the monofunctional (meth)acrylate monomer in the radiation-curable resin composition may be 3 to 30 mass % or 8 to 15 mass % with respect to 100 mass % as the total radiation-curable resin composition.

The free-radically polymerizable non-urethane monomer may also contain a polyfunctional (meth)acrylate monomer. This will further increase the crosslink density in the cured layer, and thus allows the mechanical strength of the cured layer to be increased even further.

Examples of polyfunctional (meth)acrylate monomers include trimethylolpropane tri(meth)acrylate, pentaerythritol tri(meth)acrylate, ethyleneglycol di(meth)acrylate, tetraethyleneglycol di(meth)acrylate, polyethyleneglycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl) isocyanurate di(meth)acrylate, tricyclodecanedimethanol di(meth)acrylate, di(meth)acrylates of diols of bisphenol A ethylene oxide or propylene oxide addition products, di(meth)acrylates of diols of hydrogenated bisphenol An ethylene oxide or propylene oxide addition products, epoxy (meth)acrylate obtaining by adding (meth)acrylate to bisphenol A diglycidyl ether, or triethyleneglycol divinyl ether, and the like. Examples of commercial products include YUPIMER UV SA1002 and SA2007 (both by Mitsubishi Chemical Corp.); VISCOAT 700 (Osaka Organic Chemical Industry, Ltd.); KAYARAD R-604, DPCA-20, -30, -60, -120, HX-620, D-310 and D-330 (all by Nippon Kayaku Co., Ltd.); and ARONIX M-210, M-215, M-315 and M-325 (all by ToaGosei Co., Ltd.).

The content of the polyfunctional (meth)acrylate monomer in the radiation-curable resin composition may be 2 mass % or lower, 1.5 mass % or lower or 1.0 mass % or lower, and higher than 0 mass %, with respect to 100 mass % as the total radiation-curable resin composition.

The radiation-curable resin composition may contain a free-radically polymerizable alkoxysilane as the free-radically polymerizable non-urethane monomer. The free-radically polymerizable alkoxysilane may be an alkoxysilane with an ethylenic unsaturated group, or it may be an alkoxysilane with a (meth)acryloyl group. Trimethoxysilylpropyl (meth)acrylate is an example of a free-radically polymerizable alkoxysilane.

The content of the free-radically polymerizable alkoxysilane in the radiation-curable resin composition may be higher than 0 mass % and 0.5 mass % or lower, or 0.10 mass % or higher and 0.30 mass % or lower.

The molar ratio of the alkoxysilyl group-containing urethane oligomer with respect to the free-radically polymerizable alkoxysilane may be 0.1/1 to 10/1, 0.5/1 to 7/1 or 0.7/1 to 5/1.

The radiation-curable resin composition may also further contain a non-free-radically polymerizable alkoxysilane (an alkoxysilane that does not qualify as the aforementioned free-radically polymerizable alkoxysilane). Tetraethoxysilane is an example of an alkoxysilane.

From the viewpoint of maintaining adhesive force between the covering and glass, the content of the alkoxysilane in the radiation-curable resin composition may be 0.01 to 2 mass %, 0.1 to 1.5 mass % or 0.5 to 1.5 mass %. The total content of the alkoxysilane and the free-radically polymerizable alkoxysilane in the radiation-curable resin composition may be within the range specified above.

The ratio of the total number of moles of the alkoxysilyl group-containing urethane oligomer and the free-radically polymerizable alkoxysilane with respect to the number of moles of the non-free-radically polymerizable alkoxysilane may be 0.05/1 to 4/1, 0.1/1 to 3/1, 0.2/1 to 2/1 or 0.3/1 to 1.5/1.

The ratio of the number of moles of the alkoxysilyl group-containing urethane oligomer with respect to the number of moles of the non-free-radically polymerizable alkoxysilane may be 0.01/1 to 4/1, 0.05/1 to 3/1, 0.1/1 to 2/1 or 0.1/1 to 1.5/1.

The ratio of the number of moles of the free-radically polymerizable alkoxysilane with respect to the number of moles of the non-free-radically polymerizable alkoxysilane may be 0.01/1 to 3/1, 0.05/1 to 2/1, 0.1/1 to 1.5/1 or 0.15/1 to 1/1.

The radiation-curable resin composition contains a polymerization initiator. The polymerization initiator used may be a polymerization initiator that is commonly used as a photopolymerization initiator. Examples of polymerization initiators include 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoinpropyl ether, benzoinethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide and bis-(2,6-dimethoxybenzoyl)-2,4,4-trimethylpentylphosphine oxide; IRGACURE184, 369, 651, 500, 907, CGI1700, CGI1750, CGI1850, CG24-61, DAROCUR1116 and 1173 (all by Ciba Specialty Chemicals Co., Ltd.); LUCIRIN TPO (BASF); and UBECRYL P36 (by UCB). Examples of photosensitizers include triethylamine, diethylamine, N-methyldiethanolamine, ethanolamine, 4-dimethylaminobenzoic acid, methyl 4-dimethylaminobenzoate, ethyl 4-dimethylaminobenzoate and isoamyl 4-dimethylaminobenzoate; and UBECRYL P102, 103, 104 and 105 (all by UCB).

The content of the polymerization initiator in the radiation-curable resin composition may be 0.1 to 10 mass % or 0.3 to 7 mass %, with respect to 100 mass % as the total radiation-curable resin composition.

The radiation-curable resin composition may further contain additives other than the components mentioned above. Irganox 245 is an example of such an additive.

In the radiation-curable resin composition wherein the urethane oligomer and/or free-radically polymerizable non-urethane monomer contains a (meth)acryloyl group-containing compound (for example, the aforementioned urethane (meth)acrylate oligomer or (meth)acrylate monomer), and the free-radically polymerizable non-urethane monomer contains a vinyl group-containing compound (vinyl monomer), the ratio of the number of moles of the (meth)acryloyl group-containing compound with respect to the number of moles of the vinyl group-containing compound may be 1/1 to 10/1, 1/1 to 5/1, 1/1 to 3/1, 1/1 to 2/1 or 1/1 to 1.5/1.

In the radiation-curable resin composition wherein the urethane oligomer and free-radically polymerizable non-urethane monomer comprise an ethylenic unsaturated group, the ratio of the number of moles of monofunctional compounds with one ethylenic unsaturated group with respect to the number of moles of polyfunctional compounds with two or more ethylenic unsaturated groups may be 2/1 to 100/1, 5/1 to 75/1, 10/1 to 50/1 or 15/1 to 30/1.

In the radiation-curable resin composition wherein the urethane oligomer or free-radically polymerizable non-urethane monomer contains a monofunctional (meth)acrylate (a (meth)acryloyl group-containing compound with one (meth) acryloyl group) and a polyfunctional (meth)acrylate (a (meth)acryloyl group-containing compound with two or more (meth)acryloyl groups), the ratio of the number of moles of the monofunctional (meth)acrylate in the radiation-curable resin composition with respect to the number of moles of the polyfunctional (meth)acrylate in the radiation-curable resin composition may be 1/1 to 75/1, 2/1 to 50/1 or 5/1 to 25/1.

The radiation-curable resin composition may be in liquid form. Therefore, radiation-curable resin composition particles may be in the form of a liquid radiation-curable resin composition.

The radiation-curable resin composition may also have oligomers, polymers or other additives added if necessary.

The viscosity of the radiation-curable resin composition may be 0.1 to 10 Pa·s or 1 to 8 Pa·s at 25° C., from the viewpoint of handleability and coatability. The viscosity of the radiation-curable resin composition is measured by the method described below in the Examples.

The Young's modulus at 25° C. for the cured film of the radiation-curable resin composition with curing conditions of 1 J/cm² may be 0.8 MPa or smaller. The Young's modulus may be 0.5 MPa or smaller or 0.4 MPa or smaller, and it may be 0.1 MPa to 0.8 MPa, 0.1 MPa to 0.5 MPa or 0.1 MPa to 0.4 MPa. The specific measuring conditions for the Young's modulus are as described below in the Examples.

In the radiation-curable resin composition of the embodiment, the curing speed S as defined by the following formula (1) may be 15% or higher.

$$S(\%) = Y_{20}/Y_{1000} \times 100 \quad \text{Formula (1):}$$

[In the formula, $Y_{1000}$ and $Y_{20}$ are the Young's moduli at 23° C. for cured films of the radiation-curable resin composition, the curing conditions for $Y_{1000}$ and $Y_{20}$ being 1 J/cm² and 20 mJ/cm², respectively.]

The curing speed S may be 50% or higher, 70% or higher, 80% or higher or 81% or higher. The specific measuring conditions for the curing speed S are as described below in the Examples.

The cured radiation-curable resin composition of the embodiment has excellent flexibility, and also excellent mechanical strength. The breaking strength of the cured radiation-curable resin composition may be 0.5 MPa or greater, 0.6 MPa or greater or 0.7 MPa or greater, and 10 MPa or lower or 5 MPa or lower. The breaking elongation of the cured radiation-curable resin composition may be 130 to 250% or 180 to 240%. The breaking strength and breaking elongation of the cured layer are both measured under the conditions described below in the Examples.

EXAMPLES

The present invention will now be explained in greater detail by experimental examples, with the understanding that these experimental examples are not limitative on the invention.

Example 1: Production of Radiation-Curable Resin Composition

In a reactor equipped with a stirrer there were charged 70.00 g of polypropylene glycol having a number-average molecular weight of 3000, 6.00 g of 2-4-tolylene diisocyanate and 0.019 g of 2,6-di-t-butyl-p-cresol, and the temperature was raised to a liquid temperature of 25° C. while stirring. After adding 0.032 g of dibutyltin dilaurate, the liquid temperature was gradually raised to 60° C. over a period of 30 minutes while stirring. The mixture was then stirred for 60 minutes, and after the residual isocyanate group concentration fell below 1.18 mass % (proportion with respect to the charged amount), 0.19 g of γ-mercaptopropyltrimethoxysilane, 1.34 g of 2-hydroxyethyl acrylate and 0.032 g of dibutyltin dilaurate were added and reaction was conducted for 90 minutes at a liquid temperature of 60° C. After the residual isocyanate group concentration fell below 0.37 mass % (proportion with respect to the charged amount), 1.27 g of 2-ethylhexanol was added and reaction was conducted for 60 minutes. The reaction was considered to be complete when the residual isocyanate group concentration fell below 0.05 mass %. The obtained urethane oligomer was a mixture composed mainly of urethane oligomers represented by the following formulas (I) to (III).

HEA-TDI-(PPG3000-TDI)$_{2.1}$-HEA  (I)

HEA-TDI-(PPG3000-TDI)$_{2.1}$-EH  (II)

HEA-TDI-(PPG3000-TDI)$_{2.1}$-Sil  (III)

[In the formulas, PPG3000 is a structural unit derived from polypropylene glycol with a number-average molecular weight of 3000, TDI is a structural unit derived from 2,4-tolylene diisocyanate, HEA is a structural unit derived from 2-hydroxyethyl acrylate, Sil is a structural unit derived from γ-mercaptopropyltrimethoxysilane and EH is a structural unit derived from 2-ethyl-1-hexanol, and the bonding sites "-" are all urethane bonds.]

The aliphatic alcohol (2-ethyl-1-hexanol) content in the isocyanate reactive compound (γ-mercaptopropyltrimethoxysilane, 2-hydroxyethyl acrylate and 2-ethyl-1-hexanol) was 24 mol % or higher.

The obtained urethane oligomer was used to produce a liquid curable resin composition for Example 1 having the composition shown in Table 1, and the physical property values were evaluated by the methods described below.

Example 2: Production of Radiation-Curable Resin Composition

A liquid curable resin composition for Example 2 was produced in the same manner as Example 1, except that methanol was used instead of 2-ethylhexanol, and the composition was changed as shown in Table 1. The urethane oligomer in the radiation-curable resin composition of Example 2 was a mixture composed mainly of urethane oligomers represented by formulas (I) and (III) and the following formula (IV).

HEA-TDI-(PPG3000-TDI)$_{2.1}$-Me    (IV)

[In the formula, PPG3000, TDI and HEA have the same definitions as above, and Me is a structural unit derived from methanol.]
[Evaluation Methods]
(1) Viscosity:
The 25° C. viscosities of the compositions obtained in the examples and comparative examples were measured using a B8H-BII viscometer (product of Tokimec, Inc.).
(2) Young's Modulus:
The Young's modulus was measured after curing of the compositions obtained in the examples and comparative examples. The liquid curable resin composition was coated onto a glass plate using an applicator bar with a thickness of 354 μm, and cured by irradiation with ultraviolet rays with energy of 1 J/cm$^2$ in air, to obtain a test film. A sample strip was prepared from the cured film so that the extended portion had a width of 6 mm and a length of 25 mm. A tensile test was conducted according to JIS K7127, using an AGS-1KND tensile tester (product of Shimadzu Corp.) under conditions with a temperature of 25° C. and a humidity of 50%. The Young's modulus was calculated from the tensile strength at a pull rate of 1 mm/min and a 2.5% strain.
(3) Curing Speed:
The curing speeds of the compositions obtained in the examples and comparative examples were measured. The liquid curable resin composition was coated onto a glass plate using an applicator bar with a thickness of 354 μm, and cured by irradiation with ultraviolet rays with energy of 20 mJ/cm$^2$ and 1 J/cm$^2$ in air, to obtain two types of test films. Sample strips were prepared from the two types of cured films so that their extended portions each had a width of 6 mm and a length of 25 mm. A tensile test was conducted according to JIS K7127, using an AGS-1KND tensile tester (product of Shimadzu Corp.) with a temperature of 23° C. and a humidity of 50%. The Young's modulus was calculated from the tensile strength at a pull rate of 1 mm/min and a 2.5% strain. The ratio of the Young's modulus of the test film cured at 20 mJ/cm$^2$ and the Young's modulus of the test film cured at 1 J/cm$^2$ was calculated by the following formula (1), and the curing speed S of the composition was evaluated.

$S(\%) = Y_{20}/Y_{1000} \times 100$    Formula (1):

[In the formula, $Y_{1000}$ and $Y_{20}$ are the Young's moduli at 23° C. for cured films of the radiation-curable resin composition, the curing conditions for $Y_{1000}$ and $Y_{20}$ being 1 J/cm$^2$ and 20 mJ/cm$^2$, respectively.]
(4) Breaking Strength and Breaking Elongation:
The liquid curable resin composition was coated onto a glass plate using an applicator bar with a thickness of 354 μm, and cured by irradiation with ultraviolet rays with energy of 1 J/cm$^2$ in air, to obtain a test film. The breaking strength and breaking elongation of a test strip were measured using a tensile tester (AGS-50G by Shimadzu Corp.), under the following measuring conditions.
Pull rate: 50 mm/min
Gauge length (measuring distance): 25 mm
Measuring temperature: 23° C.
Relative humidity: 50%

(5) Glass Adhesive Force:
The glass adhesive force was measured for the radiation-curable resin compositions obtained in the Examples. The liquid curable resin composition was coated onto a glass plate using an applicator bar with a thickness of 354 microns, and cured by irradiation with ultraviolet rays with energy of 1 J/cm$^2$ in air, to obtain a test film. A sample strip was prepared from the cured film so that the extended portion had a width of 10 mm and a length of 50 mm. After allowing it to stand for 7 days at a temperature of 23° C. and a humidity of 50%, a glass adhesive force test was conducted using an AGS-1KND tensile tester (product of Shimadzu Corp.) under the same temperature and humidity conditions. The glass adhesive force was determined from the tensile strength after 30 seconds with a pull rate of 50 mm/min.
(6) Gel Fraction:
The liquid curable resin composition was coated onto a glass plate using an applicator bar with a thickness of 354 μm, and cured by irradiation with ultraviolet rays with energy of 1 J/cm$^2$ in air, to obtain a test film. After curing, the sheet was allowed to stand for 24 hours in a thermohygrostat at a temperature of 23° C. and a humidity of 50%. A 1.5 g portion of the cured layer was then cut out and inserted into cylindrical filter paper, and a Soxhlet extractor was used for 12 hours of extraction with MEK (methyl ethyl ketone) at a temperature of 80° C. Following extraction, the sample was removed out with the filter paper and subjected to vacuum drying for 6 hours at a temperature of 60° C. and a pressure of ≤1.34 kPa. The sample was removed from the filter paper and its weight was measured. The gel fraction was calculated by the following formula.

Gel fraction (%) = $W1/W0 \times 100$

[In the formula, W0 is the weight of the sample before extraction, and W1 is the weight of the sample after extraction.]

Table 1 shows the glass transition temperature (Tg) values for the cured radiation-curable resin compositions of Examples 1 and 2 (curing conditions: 1.0 J/cm$^2$, 200 μm thickness).

TABLE 1

|  |  |  | Example 1 | Example 2 |
|---|---|---|---|---|
| Composition (mass %) | Urethane oligomer | (I) | 3.0 | 3.0 |
|  |  | (II) | 70 | — |
|  |  | (III) | 7.0 | 7.0 |
|  |  | (IV) | — | 70 |
|  | Free-radically polymerizable non-urethane monomer | 2-Ethylhexyl acrylate | 10 | 10 |
|  |  | N-Vinyl caprolactam | 8.5 | 8.5 |
|  |  | Trimethyl-propane triacrylate | 0.50 | 0.50 |
|  |  | Trimethoxy-silyl propyl methacrylate | 0.15 | — |
|  | Non-radical-polymerizing alkoxysilane | Tetra-ethoxysilane | 0.50 | 0.65 |
|  | Photo-polymerization initiator | TPO-X | 1.2 | 1.2 |
|  | Additive | Irganox 245 | 0.60 | 0..60 |
| Evaluation | Viscosity (Pa · s) |  | 4.9 | 5.5 |
|  | Young's modulus (MPa) |  | 0.30 | 0.30 |
|  | Curing speed (%) |  | 80 | — |
|  | Breaking strength (MPa) |  | 0.8 | 1.1 |
|  | Breaking elongation (%) |  | 194 | 232 |

TABLE 1-continued

| | Example 1 | Example 2 |
|---|---|---|
| Glass adhesive force (N/m) | 15 | 14 |
| Gel fraction | 72 | 74 |
| Tg (° C., 3.5 Hz) | −48 | −48 |

The invention claimed is:

1. A radiation-curable resin composition for formation of a primary covering layer of an optical fiber, comprising a urethane oligomer with an ethylenic unsaturated group, a free-radically polymerizable non-urethane monomer and a polymerization initiator, wherein
the urethane oligomer with an ethylenic unsaturated group is the reaction product of a polyether-based urethane prepolymer and an isocyanate reactive compound containing one active hydrogen group,
the isocyanate reactive compound contains an aliphatic alcohol and an ethylenic unsaturated group-containing isocyanate reactive compound,
the aliphatic alcohol content in the isocyanate reactive compound is 24 mol % or higher, and
the urethane oligomer with an ethylenic unsaturated group contains a monofunctional urethane (meth)acrylate oligomer and a bifunctional urethane (meth)acrylate oligomer wherein a ratio of the number of moles of the monofunctional urethane (meth)acrylate oligomer with respect to the number of moles of the bifunctional urethane (meth)acrylate oligomer is from 3/1 to 100/1.

2. The radiation-curable resin composition according to claim 1, wherein the radiation-curable resin composition possesses a curing speed S of 15% or higher as defined by the following formula (1):

$$S(\%) = Y_{20}/Y_{1000} \times 100; \text{ wherein} \quad \text{formula (1):}$$

per the formula, $Y_{1000}$ and $Y_{20}$ each represent a Young's modulus at 23° C. for cured films of the radiation-curable resin composition, wherein the cured films are created under a 1 J/cm² curing condition for $Y_{1000}$, and a 20 mJ/cm² curing condition for $Y_{20}$.

3. The radiation-curable resin composition according to claim 1, wherein the Young's modulus at 25° C. for the cured film of the radiation-curable resin composition with curing conditions of 1 J/cm² is 0.8 MPa or smaller.

4. The radiation-curable resin composition according to claim 1, wherein the free-radically polymerizable non-urethane monomer contains at least one vinyl group-containing compound selected from the group consisting of vinyl ester compounds and vinylamide compounds.

5. The radiation-curable resin composition according to claim 4, wherein the vinylamide compound contains N-vinylcaprolactam.

6. The radiation-curable resin composition according to claim 5, wherein at least a portion of the urethane oligomer with an ethylenic unsaturated group and/or free-radically polymerizable non-urethane monomer is a (meth)acryloyl group-containing compound, and
a ratio of the number of moles of the (meth)acryloyl group-containing compound with respect to the number of moles of the vinyl group-containing compound is from 1/1 to 10/1.

7. The radiation-curable resin composition according to claim 1, wherein the urethane oligomer with an ethylenic unsaturated group and the free-radically polymerizable non-urethane monomer comprise an ethylenic unsaturated group, and
a ratio of the number of moles of monofunctional compounds with one ethylenic unsaturated group with respect to the number of moles of polyfunctional compounds with two or more ethylenic unsaturated groups is from 2/1 to 100/1.

8. The radiation-curable resin composition according to claim 6, wherein
the urethane oligomer with an ethylenic unsaturated group or the free-radically polymerizable non-urethane monomer contains a monofunctional (meth)acrylate and a polyfunctional (meth)acrylate, and
a ratio of the number of moles of the monofunctional (meth)acrylate in the radiation-curable resin composition with respect to the number of moles of the polyfunctional (meth)acrylate is from 1/1 to 75/1.

9. The radiation-curable resin composition according to claim 1, wherein the number-average molecular weight of the urethane oligomer with an ethylenic unsaturated group is 2000 or greater.

10. The radiation-curable resin composition according to claim 1, wherein the urethane oligomer with an ethylenic unsaturated group contains an alkoxysilyl group-containing urethane oligomer having one (meth)acryloyl group at one end and one alkoxysilyl group at the other end.

11. The radiation-curable resin composition according to claim 10, wherein
a ratio of the number of moles of the alkoxysilyl group-containing urethane oligomer with respect to the number of moles of the monofunctional urethane (meth)acrylate oligomer other than the alkoxysilyl group-containing urethane oligomer is from 0.01/1 to 0.7/1.

12. The radiation-curable resin composition according to claim 11, wherein
a ratio of the number of moles of the alkoxysilyl group-containing urethane oligomer with respect to the number of moles of the bifunctional urethane (meth)acrylate oligomer is from 0.2/1 to 20/1.

13. The radiation-curable resin composition according to claim 12, wherein the free-radically polymerizable non-urethane monomer contains a free-radically polymerizable alkoxysilane.

14. The radiation-curable resin composition according to claim 13, wherein the free-radically polymerizable alkoxysilane has a (meth)acryloyl group.

15. The radiation-curable resin composition according to claim 14, wherein
the urethane oligomer with an ethylenic unsaturated group contains an alkoxysilyl group-containing urethane oligomer having one (meth)acryloyl group at one end and one alkoxysilyl group at the other end, and
the molar ratio of the alkoxysilyl group-containing urethane oligomer with respect to the free-radically polymerizable alkoxysilane is from 0.1/1 to 10/1.

16. The radiation-curable resin composition according to claim 1, further comprising a non-free-radically polymerizable alkoxysilane.

17. The radiation-curable resin composition according to claim 16, wherein
the urethane oligomer with an ethylenic unsaturated group contains an alkoxysilyl group-containing urethane oligomer having one (meth)acryloyl group at one end and one alkoxysilyl group at the other end, and
a molar ratio of the number of moles of the alkoxysilyl group-containing urethane oligomer with respect to the number of moles of the non-free-radically polymerizable alkoxysilane is from 0.01/1 to 4/1.

18. The radiation-curable resin composition according to claim 17, wherein the free-radically polymerizable non-urethane monomer contains a free-radically polymerizable alkoxysilane, and the ratio of the number of moles of the free-radically polymerizable alkoxysilane with respect to the number of moles of the non-free-radically polymerizable alkoxysilane is from 0.01/1 to 3/1.

19. The radiation-curable resin composition according to claim 18, wherein the urethane oligomer with an ethylenic unsaturated group contains an alkoxysilyl group-containing urethane oligomer having one (meth)acryloyl group at one end and one alkoxysilyl group at the other end, and a free-radically polymerizable alkoxysilane, and the free-radically polymerizable non-urethane monomer contains a free-radically polymerizable alkoxysilane, and the ratio of the total number of moles of the alkoxysilyl group-containing urethane oligomer and the free-radically polymerizable alkoxysilane with respect to the number of moles of the non-free-radically polymerizable alkoxysilane is from 0.05/1 to 4/1.

\* \* \* \* \*